United States Patent [19]
Kivari

[11] Patent Number: 5,276,691
[45] Date of Patent: Jan. 4, 1994

[54] METHOD FOR THE CONTROL OF RECEIVER SYNCHRONIZATION IN A MOBILE PHONE

[75] Inventor: Raimo Kivari, Haukipudas, Finland

[73] Assignee: Nokia Mobile Phones Ltd., Salo, Finland

[21] Appl. No.: 823,159

[22] Filed: Jan. 21, 1992

[51] Int. Cl.$^5$ ................................. H04J 3/14
[52] U.S. Cl. ................... 371/47.1; 371/20.4; 371/5.4
[58] Field of Search .............. 371/47.1, 46, 42, 5.4, 371/20.1, 20.4

[56] References Cited

U.S. PATENT DOCUMENTS 5,163,057 11/1992 Grupp .................... 371/47.1

FOREIGN PATENT DOCUMENTS

| 2633007 | 2/1977 | Fed. Rep. of Germany | 371/47.1 |
| 3023860 | 1/1982 | Fed. Rep. of Germany | 371/47.1 |
| 2-113739 | 4/1990 | Japan | 371/47.1 |

Primary Examiner—Hoa T. Nguyen
Attorney, Agent, or Firm—Darby & Darby

[57] ABSTRACT

A receiver synchronization control in signalling messages in TACS/AMPS system in a mobile phone is disclosed. In order to avoid unnecessary setting of hunt mode operation, if the received synchronization pattern is not congruent with the correct reference pattern, the received pattern is checked in a bit-by-bit manner so as to reveal occasional bit errors of one or two bits, which may appear although the receiver is in synchronization. A further check may be conducted by shifting a reference pattern mask by one or at the most two bits in either direction, whereafter rechecking to reveal either fully correct pattern or rechecking for only one or two bits error can be performed.

8 Claims, 1 Drawing Sheet

|  |  | CHECK ERRORS | RECHECK ERRORS | ACCEPTED |
|---|---|---|---|---|
| CORRECT PATTERN | 1 1 1 0 0 0 1 0 0 1 0 |  |  |  |
| RECEIVED A | 1 1 0 0 0 0 1 0 0 1 0 | ONE |  | YES |
| RECEIVED B | 0 1 1 1 0 0 1 1 0 0 1 | FIVE |  | NO |
| + ONE BIT SHIFT B | 1 1 1 0 0 1 1 0 0 1 0 |  | ONE | YES |
| RECEIVED C | 0 1 0 0 0 1 1 0 1 0 0 | FIVE |  | NO |
| + ONE BIT SHIFT C | 1 0 0 0 1 1 0 1 0 0 0 |  | SEVEN | NO |
| − ONE BIT SHIFT C | 0 0 1 0 0 0 1 1 0 1 0 |  | THREE | NO |

| | | CHECK ERRORS | RECHECK ERRORS | ACCEPTED |
|---|---|---|---|---|
| CORRECT PATTERN | 1 1 1 0 0 0 1 0 0 1 0 | | | |
| RECEIVED A | 1 1 0 0 0 0 1 0 0 1 0 | ONE | | YES |
| RECEIVED B | 0 1 1 1 0 0 1 1 0 0 1 | FIVE | | NO |
| + ONE BIT SHIFT B | 1 1 1 0 0 1 1 0 0 1 0 | | ONE | YES |
| RECEIVED C | 0 1 0 0 0 1 1 0 1 0 0 | FIVE | | NO |
| + ONE BIT SHIFT C | 1 0 0 0 1 1 0 1 0 0 0 | | SEVEN | NO |
| − ONE BIT SHIFT C | 0 0 1 0 0 0 1 1 0 1 0 | | THREE | NO |

FIG. 1

METHOD FOR THE CONTROL OF RECEIVER SYNCHRONIZATION IN A MOBILE PHONE

FIELD OF THE INVENTION

The present invention relates to a method for controlling the receiver synchronization in signalling messages in a mobile phone system, for example the TACS/AMPS system.

BACKGROUND OF THE INVENTION

Synchronization of the TACS/AMPS mobile phone system is based on an eleven bit word synchronization pattern observed at the receiver in the received frame. The mobile telephone determines that the receiver is in synchronization if the eleven bit word synchronization pattern is identical to a reference word.

There is one checking operation for the control channel (FOCC) and one control operation for the speech channel (FVC).

If the two last word synchronizations in the control channel are lost (SFLAG=0 for the time of two frames), and the decoding results for the data shows the data content to be erroneous, a "hunt mode" is initiated. In the hunt mode, the receiver's frame counter is reset to zero and a search is initiated for a new word synchronization pattern to enable receiving data again.

Generally, there are two possible reasons for the lost synchronization words. One reason is that occasional bit errors appear in the word synchronization pattern and the data field, but the phase of the received bits (the phase of the frame counter) may be correct. In such a situation, prior art devices unnecessarily initiate the hunt mode. This may lead to losing the subsequent frame if the new word synchronization pattern is not captured immediately.

Second, the phase may be wrong because the phase lock has slipped, normally 1 . . . n bits leading or trailing the proper phase. In this case, the hunt mode should be set to correct the phase error. However, if the phase error could be detected within the first frame, the hunt mode could be set without delay, thus correcting the error with a minimum of lost time and data.

In the speech channel (FVC), if the last word synchronization has been lost (SFLAG=0), the hunt mode is set.

In the speech channel, the decoding results detect an error in the same way as the control channel. The drawback may be that the hunt mode is set unnecessarily.

As already mentioned, setting the hunt mode unnecessarily may cause the loss of the following frame, if the following word synchronization pattern contains even one bit error. In such a case, the pattern cannot be captured. Frames will continue to be lost until a word synchronization pattern free of errors is received.

The situation described above appear in the prior art. The unnecessary setting of the hunt mode is detrimental, particularly for the user's own speech channel (FVC), since loss of repetitions decreases performance of the phone.

Unnecessary hunt mode also sets the phase lock of the data receiver to a broad band operation, which causes excessive jitter in the receiver clock, and can cause slipping of the phase lock and loss of correct phase, thus causing bit errors.

SUMMARY OF THE INVENTION

It is an object of the present invention to eliminate the drawbacks explained above. This is done by determining whether the lost synchronization words and decoding error actually represents a loss of synchronization, or only appears to be so, because the word synchronization pattern includes bit errors.

More precisely, it is an object of the invention to establish at as early a stage as possible, whether there is an actual lost synchronization, whereby the hunt mode should be set immediately, or whether the wrong interpretation has been caused by occasional bit errors and the hunt mode should not be set.

In order to achieve these objects, the invention relates to a method comprising the steps of:
1. receiving transmitted binary data frames, each frame including a synchronization pattern of a certain number of bits (for example, eleven bits);
2. comparing at the receiver the received synchronization pattern in a bit-by-bit manner to a predetermined synchronization pattern;
3. conducting at least one of the following checking operations to determine if synchronization is lost, namely checking the number of occasional individual bit errors, shifting a checking mask, equal to the predetermined (correct) synchronization pattern, a step of either one or two bits in either direction and rechecking the pattern to determine if it is identical to the correct synchronization pattern (indicating a synchronization loss); and when the number of individual bit errors is no more than two, accepting the received synchronization pattern as correct.

In a preferred embodiment of the invention, the number of individual bit errors accepted is one.

BRIEF DESCRIPTION OF THE DRAWING

FIG. 1 shows an example of a correct synchronization pattern as compared with received patterns A, B, and C.

DESCRIPTION OF A PREFERRED EMBODIMENT

The preferred embodiment is described in relation to the TACS/AMPS mobile telephone system, which is based on signalling messages containing eleven bit word synchronization patterns. The correct word synchronization pattern in the TACS/AMPS system is 11100010010, which will be used in this example. However, it would be obvious to one skilled in the art that the disclosed method could be used in relation to other mobile telephone systems as well.

According to the present invention, the received synchronization pattern is checked with reference to the correct pattern, not only as to whether it is identical or nonidentical with the reference pattern, but it is checked in a bit-by-bit manner to reveal occasional bit errors or small phase errors on the order of one or two bits.

In the initial checking stage, either one or at the most two erroneous bits in the frame are accepted. Eventual slide phase shift can be checked or identified by phase shifting the reference mask by one bit of the time in either direction. The reference mask phase shift should be done with one or two bit shifts at the most. Upon such one or two bits phase shift, the pattern can be checked for occasional bit errors, as described above.

In the example given in the drawing, the received pattern A has only a one bit error as compared with the reference. It is determined that the error is a bit error and not a synchronization error, it is accepted and the hunt mode is not set.

Pattern B has initially a five bit error, but a + one bit phase shift reveals that there is only a one bit error. Thus, correct word synchronization pattern (with one bit error) is detected but in the wrong phase, and therefore the hunt mode is set immediately.

Pattern C, even when phase shifted one or even two bits (not shown in the figure) in either direction, always reveals at least three erroneous bits and is not accepted. Thus, also pattern C would lead to setting of the hunt mode immediately.

In other words, detection of the correct pattern (or a pattern with one or to bit errors) in a correct position (e.g., Pattern A) will not lead to setting the hunt mode. Detecting the correct pattern (with or without one or two bit errors) in the wrong position (e.g., Pattern B) causes immediately setting of the hunt mode, but without any need for further checking or waiting for the next word synchronization pattern to be received. Where the correct pattern cannot be detected (e.g., Pattern C), the hunt mode is immediately initiated.

Even with a phase shift of two bits, the "distance" of the mask from a correct word synchronization pattern, if, for example, five bits do not correspond to the reference synchronization word pattern, the reason is probably a phase error and not just an occasional bit error.

Obviously, mask checking with phase shifts over three to four bits would cause more checking of occasional bit errors and probably would not be advantageous over checking only after one or two bits phase shifts at the most, as suggested above.

The practical implementation of the method according to the present invention could be performed either with a hardware circuit or within the program of the receiver processor. In the first implementation, the circuitry would automatically determine whether the synchronization word loss is due to an occasional bit error in the word synchronization pattern, or an actual loss of phase. This would require a moderate amount of increased hardware and cost. The processor would read the checking result information from the status bits.

In the second implementation, the processor would read the word synchronization pattern over a register and thereafter check the contents thereof bit-by-bit. This would require less additional hardware than the first case, but the program functions would be somewhat increased.

I claim:

1. A method for determining the cause of an incorrect synchronization word pattern in a received mobile telephone signal having a succession of frames, comprising the steps of:
   (1) receiving binary data frames having a synchronization pattern;
   (2) a first step of comparing bit-by-bit the received synchronization pattern with a predetermined synchronization pattern;
   (3) accepting the received synchronization pattern as correct if the first step of comparing determines no more than two bits of the received synchronization pattern differ from the predetermined synchronization pattern;
   (4) if the first step of comparing determines that the received synchronization pattern is not accepted, a second step of comparing bit-by-bit the received synchronization pattern with a phase shifted version of the predetermined synchronization pattern; and
   (5) accepting the required synchronization pattern as correct, but out of synchronization, if the second step of comparing determines no more than two bits of the received synchronization pattern differs from the phase shifted version of the predetermined synchronizing pattern, otherwise indicating a loss of received synchronization and not accepting the synchronization pattern as correct.

2. The method of claim 1, wherein when the first step of comparing does not accept the received synchronization pattern as correct, initiating a hunt mode for synchronization in the next frame.

3. The method of claim 1, wherein when the second step of comparing accepts the received synchronization pattern, a synchronization loss is indicated and a hunt mode for synchronization is initiated immediately.

4. The method of claim 1, wherein when the second step of comparing does not accept the received synchronization pattern, a hunt mode for synchronization is initiated immediately.

5. The method of claim 1, wherein the second step of comparing includes using a phase shifted version of the predetermined synchronization pattern that is phase shifted no more than two bits.

6. The method of claim 5, wherein the second step of comparing includes:
   (a) phase shifting the version so as to lead by one bit; comparing the one bit leading phase shifted version with the received synchronization pattern; if the received synchronization pattern is not accepted; then
   (b) phase shifting the version so as to lag by one bit; comparing the one bit lagging version with the received synchronization pattern; if the received synchronization pattern is not accepted; then
   (c) phase shifting the version so as to lead by two bits; comparing the two bit leading phase shifted version with the received synchronization pattern; if the received synchronization pattern is not accepted; then
   (d) phase shifting the version so as to lag by two bits; comparing the two bit lagging phase shifted version with the received synchronization pattern; and
   regardless of whether the received synchronization pattern is accepted, immediately initiating the hunt mode.

7. The method of claim 5, wherein the second step of checking includes:
   (a) phase shifting the version of the predetermined synchronization pattern so as to lead same by one bit; comparing the one bit leading phase shifted version with the received synchronization pattern; if the received synchronization pattern is not accepted; then
   (b) phase shifting the version so as to lead by two bits; comparing the two bit leading phase shifted version with the received synchronization pattern; if the received synchronization pattern is not accepted; then (c) phase shifting the version so as to lag by one bit;

comparing the one bit lagging version with the received synchronization pattern;

if the received synchronization pattern is not accepted; then (d) phase shifting the version so as to lag by two bits; comparing the two bit lagging phase shifted version with the received synchronization pattern; and regardless of whether the received synchronization pattern is accepted immediately initiating the hunt mode.

8. The method of claim 1, wherein the first and second steps of checking will accept the received synchronization pattern only if one or fewer differences are detected.

* * * * *